(12) United States Patent
Mudd et al.

(10) Patent No.: US 11,003,198 B2
(45) Date of Patent: May 11, 2021

(54) CONTROLLED DELIVERY OF PROCESS GAS USING A REMOTE PRESSURE MEASUREMENT DEVICE

(71) Applicant: Reno Technologies, Inc., Wilmington, DE (US)

(72) Inventors: Daniel T. Mudd, Reno, NV (US); Patti J Mudd, Reno, NV (US)

(73) Assignee: ICHOR SYSTEMS, INC.

( * ) Notice: Subject to any disclaimer, the term of this patent is extended or adjusted under 35 U.S.C. 154(b) by 1041 days.

(21) Appl. No.: 14/854,043

(22) Filed: Sep. 15, 2015

(65) Prior Publication Data

US 2016/0011604 A1 Jan. 14, 2016

Related U.S. Application Data

(63) Continuation of application No. 13/590,152, filed on Aug. 20, 2012, now Pat. No. 9,188,989.

(60) Provisional application No. 61/575,359, filed on Aug. 20, 2011.

(51) Int. Cl.
| | |
|---|---|
| *F16L 37/00* | (2006.01) |
| *G05D 16/20* | (2006.01) |
| *G05D 7/06* | (2006.01) |
| *F16K 27/00* | (2006.01) |
| *F16K 47/08* | (2006.01) |
| *F16K 37/00* | (2006.01) |

(52) U.S. Cl.
CPC ....... *G05D 16/2006* (2013.01); *F16K 27/003* (2013.01); *F16K 37/005* (2013.01); *F16K 47/08* (2013.01); *G05D 7/0629* (2013.01); *G05D 7/0635* (2013.01); *G05D 7/0641* (2013.01)

(58) Field of Classification Search
CPC ............... G05D 7/0635; G05D 7/0647; G05D 16/2006; G01F 1/36; Y10T 137/7759; Y10T 137/7761
USPC ........... 137/487, 487.5, 488, 599.01, 599.06, 137/599.07, 601.14, 870, 883
See application file for complete search history.

(56) References Cited

U.S. PATENT DOCUMENTS

| | | | |
|---|---|---|---|
| 2,666,297 | A | 1/1954 | Skousgaard |
| 3,271,994 | A | 9/1966 | Fournier et al. |
| 3,335,748 | A | 8/1967 | Klemm et al. |
| 3,453,861 | A | 7/1969 | Levasseur |
| 3,491,946 | A | 1/1970 | Muller |
| 3,504,692 | A | 4/1970 | Goldstein |

(Continued)

FOREIGN PATENT DOCUMENTS

| | | |
|---|---|---|
| CN | 1816733 | 8/2006 |
| CN | 102354228 | 2/2012 |

(Continued)

*Primary Examiner* — Reinaldo Sanchez-Medina
*Assistant Examiner* — Mary E McManmon
(74) *Attorney, Agent, or Firm* — The Belles Group, P.C.

(57) ABSTRACT

A flow node includes characterized restrictor in series and adjacent with a valve to provide a primary flow restriction with a minimized volume between the two. A conductance of the characterized restrictor is low enough relative to the valve seat to cause a pressure drop that is sufficiently large relative to the pressure drop across the valve seat that a pressure measurement device is located upstream of the valve is used to determine the pressure to the inlet of the restrictor. A vent can be included to reduce bleed time. Multiple flow nodes in parallel increase a dynamic range.

19 Claims, 12 Drawing Sheets

(56) References Cited

U.S. PATENT DOCUMENTS

| | | |
|---|---|---|
| 3,559,482 A | 2/1971 | Baker et al. |
| 3,570,807 A | 3/1971 | Sturman et al. |
| 3,807,456 A | 4/1974 | Colletti |
| 3,814,541 A | 6/1974 | Dent et al. |
| 3,841,520 A | 10/1974 | Bryant et al. |
| 3,910,113 A | 10/1975 | Brown |
| 4,015,626 A | 4/1977 | Thordarson |
| 4,096,746 A | 6/1978 | Wilson et al. |
| 4,118,009 A | 10/1978 | Chmura |
| 4,203,465 A | 5/1980 | Rissi |
| 4,253,156 A | 2/1981 | Lisle et al. |
| 4,275,752 A | 6/1981 | Collier et al. |
| 4,304,263 A | 12/1981 | Choate |
| 4,315,523 A | 2/1982 | Mahawili et al. |
| 4,327,757 A | 5/1982 | Weevers |
| 4,406,161 A | 9/1983 | Locke et al. |
| 4,462,915 A | 7/1984 | Friedman |
| 4,576,043 A | 3/1986 | Nguyen |
| 4,589,440 A | 5/1986 | Panet |
| 4,718,443 A | 1/1988 | Adney et al. |
| 4,741,359 A | 5/1988 | Siebald |
| 4,796,651 A | 1/1989 | Ginn et al. |
| 4,858,643 A | 8/1989 | Vavra et al. |
| 4,888,117 A | 12/1989 | Brown et al. |
| 4,904,285 A | 2/1990 | Yamada et al. |
| 4,918,995 A | 4/1990 | Pearman et al. |
| 5,003,810 A | 4/1991 | Jepson et al. |
| 5,044,199 A | 9/1991 | Drexel et al. |
| 5,052,363 A | 10/1991 | Stiles |
| 5,062,446 A | 11/1991 | Anderson |
| 5,080,131 A | 1/1992 | Ono et al. |
| 5,100,100 A | 3/1992 | Benson et al. |
| 5,100,551 A | 3/1992 | Pall et al. |
| 5,114,447 A | 5/1992 | Davis et al. |
| 5,123,439 A | 6/1992 | Powers |
| 5,129,418 A | 7/1992 | Shimomura et al. |
| 5,152,483 A | 10/1992 | Maeng |
| 5,159,951 A | 11/1992 | Ono et al. |
| 5,161,576 A | 11/1992 | Hekkert et al. |
| 5,187,771 A | 2/1993 | Uchida |
| 5,187,972 A | 2/1993 | Defriez |
| 5,190,068 A | 3/1993 | Philbin |
| 5,259,243 A | 11/1993 | Drexel et al. |
| 5,280,773 A | 1/1994 | Becker |
| 5,285,673 A | 2/1994 | Drexel et al. |
| 5,297,427 A | 3/1994 | Shambayati |
| 5,305,638 A | 4/1994 | Saghatchi et al. |
| 5,311,762 A | 5/1994 | Drexel |
| 5,321,992 A | 6/1994 | Mudd et al. |
| 5,325,705 A | 7/1994 | Tom |
| 5,329,966 A | 7/1994 | Fenimore et al. |
| 5,359,878 A | 11/1994 | Mudd |
| 5,419,133 A | 5/1995 | Schneider |
| 5,439,026 A * | 8/1995 | Moriya .............. G05D 7/0635 137/486 |
| 5,445,035 A | 8/1995 | Delajoud |
| 5,511,585 A | 4/1996 | Lee |
| 5,542,284 A | 8/1996 | Layzell et al. |
| 5,549,272 A | 8/1996 | Kautz |
| 5,583,282 A | 12/1996 | Tom |
| 5,624,409 A | 4/1997 | Seale |
| 5,660,207 A | 8/1997 | Mudd |
| 5,669,408 A | 9/1997 | Nishino et al. |
| 5,711,786 A | 1/1998 | Hinishaw |
| 5,730,181 A | 3/1998 | Doyle et al. |
| 5,762,086 A | 6/1998 | Ollivier |
| 5,804,717 A | 9/1998 | Lucas |
| 5,816,285 A | 10/1998 | Ohmi et al. |
| 5,865,205 A | 2/1999 | Wilmer |
| 5,868,159 A | 2/1999 | Loan et al. |
| 5,904,170 A | 5/1999 | Harvey et al. |
| 5,911,238 A | 6/1999 | Bump et al. |
| 5,917,066 A | 6/1999 | Eisenmann et al. |
| 5,918,616 A | 7/1999 | Sanfilippo et al. |
| 5,935,418 A | 8/1999 | Chakrabarty et al. |
| 5,944,048 A | 8/1999 | Bump et al. |
| 5,970,801 A | 10/1999 | Ciobanu et al. |
| 5,975,126 A | 11/1999 | Bump et al. |
| 5,988,211 A | 11/1999 | Cornell |
| 6,015,590 A | 1/2000 | Suntola |
| 6,026,834 A | 2/2000 | Azima |
| 6,026,847 A | 2/2000 | Reinicke et al. |
| 6,062,246 A | 5/2000 | Tanaka et al. |
| 6,062,256 A * | 5/2000 | Miller .............. F16K 31/004 137/487.5 |
| 6,074,691 A | 6/2000 | Schmitt et al. |
| 6,080,219 A | 6/2000 | Jha et al. |
| 6,116,269 A | 9/2000 | Maxson |
| 6,119,710 A | 9/2000 | Brown |
| 6,125,869 A | 10/2000 | Horiuchi |
| 6,138,708 A | 10/2000 | Waldbusser |
| 6,152,162 A | 11/2000 | Balazy et al. |
| 6,178,995 B1 | 1/2001 | Ohmi et al. |
| 6,269,692 B1 | 8/2001 | Drexel et al. |
| 6,303,501 B1 | 10/2001 | Chen et al. |
| 6,314,991 B1 | 11/2001 | Gill |
| 6,352,001 B1 | 3/2002 | Wickert et al. |
| 6,422,256 B1 * | 7/2002 | Balazy .............. G05D 7/0635 137/12 |
| 6,422,264 B2 | 7/2002 | Ohmi et al. |
| 6,425,281 B1 | 7/2002 | Sheriff et al. |
| 6,443,174 B2 | 9/2002 | Mudd |
| 6,539,968 B1 | 4/2003 | White et al. |
| 6,561,218 B2 | 5/2003 | Mudd |
| 6,564,825 B2 | 5/2003 | Lowery et al. |
| 6,631,334 B2 | 10/2003 | Grosshart |
| 6,655,408 B2 | 12/2003 | Linthorst |
| 6,712,084 B2 | 3/2004 | Shajii et al. |
| 6,752,166 B2 | 6/2004 | Lull et al. |
| 6,799,603 B1 | 10/2004 | Moore |
| 6,832,628 B2 | 12/2004 | Thordarson et al. |
| 6,868,862 B2 | 3/2005 | Shajii et al. |
| 6,881,263 B2 | 4/2005 | Lindfors et al. |
| 6,948,508 B2 | 9/2005 | Shajii et al. |
| 7,037,372 B2 | 5/2006 | Lindfors et al. |
| 7,073,392 B2 | 7/2006 | Lull et al. |
| 7,136,767 B2 | 11/2006 | Shajii et al. |
| 7,216,019 B2 | 5/2007 | Tinsley et al. |
| 7,252,032 B2 | 8/2007 | Scheffel et al. |
| 7,334,602 B2 | 2/2008 | Ahn |
| 7,337,805 B2 | 3/2008 | Brown et al. |
| 7,353,841 B2 | 4/2008 | Kono et al. |
| 7,370,664 B2 | 5/2008 | Glite |
| 7,424,346 B2 | 9/2008 | Shajii et al. |
| 7,431,045 B2 | 10/2008 | Mudd et al. |
| 7,474,968 B2 | 1/2009 | Ding et al. |
| 7,552,015 B2 | 6/2009 | Shajii et al. |
| 7,615,120 B2 | 11/2009 | Shajii et al. |
| 7,628,861 B2 | 12/2009 | Clark |
| 7,662,233 B2 | 2/2010 | Sneh |
| 7,680,399 B2 | 3/2010 | Buchanan et al. |
| 7,682,946 B2 | 3/2010 | Ma et al. |
| 7,693,606 B2 | 4/2010 | Ahmad et al. |
| 7,706,925 B2 | 4/2010 | Ding et al. |
| 7,717,061 B2 | 5/2010 | Ishizaka et al. |
| 7,757,554 B2 | 7/2010 | Ding et al. |
| 7,809,473 B2 | 10/2010 | Shajii et al. |
| 7,826,986 B2 | 11/2010 | McDonald |
| 7,850,779 B2 | 12/2010 | Ma et al. |
| 7,874,208 B2 | 1/2011 | Redemann et al. |
| 7,881,829 B2 | 2/2011 | Yoneda et al. |
| 7,891,228 B2 | 2/2011 | Ding et al. |
| 7,905,139 B2 | 3/2011 | Lull |
| 7,918,238 B2 | 4/2011 | Tanaka et al. |
| 7,922,150 B2 | 4/2011 | Cripps et al. |
| 7,974,544 B2 | 7/2011 | Kobayashi et al. |
| 7,979,165 B2 | 7/2011 | Gotoh et al. |
| 8,100,382 B2 | 1/2012 | Robertson, III et al. |
| 8,104,323 B2 | 1/2012 | Yasuda |
| 8,112,182 B2 | 2/2012 | Tokuhisa et al. |
| 8,183,781 B2 | 5/2012 | Sangam |
| 8,201,989 B2 | 6/2012 | Itoh et al. |
| 8,205,629 B2 | 6/2012 | Gregor et al. |
| 8,265,795 B2 | 9/2012 | Takahashi et al. |

(56) References Cited

U.S. PATENT DOCUMENTS

| | | | |
|---|---|---|---|
| 8,282,992 | B2 | 10/2012 | Myo et al. |
| 8,291,857 | B2 | 10/2012 | Lam et al. |
| 8,293,015 | B2 | 10/2012 | Lam et al. |
| 8,340,827 | B2 | 12/2012 | Yun et al. |
| 8,343,258 | B2 | 1/2013 | Guan |
| 8,343,279 | B2 | 1/2013 | Myo et al. |
| 8,356,623 | B2 | 1/2013 | Isobe et al. |
| 8,376,312 | B2 | 2/2013 | Mudd et al. |
| 8,382,897 | B2 | 2/2013 | Sangam |
| 8,408,245 | B2 | 4/2013 | Feldman et al. |
| 8,443,649 | B2 | 5/2013 | Yasuda et al. |
| 8,460,753 | B2 | 6/2013 | Xiao et al. |
| 8,504,318 | B2 | 8/2013 | Mendelson et al. |
| 8,505,478 | B2 | 8/2013 | Suekane et al. |
| 8,511,337 | B2 * | 8/2013 | Nishimura ............... F16K 1/42 137/487.5 |
| 8,573,247 | B2 | 11/2013 | Ushigusa et al. |
| 8,744,784 | B2 | 6/2014 | Yasuda et al. |
| 8,746,057 | B2 | 6/2014 | Yasuda et al. |
| 8,770,215 | B1 | 7/2014 | Mudd et al. |
| 8,789,556 | B2 | 7/2014 | Yasuda et al. |
| 8,793,082 | B2 | 7/2014 | Ding et al. |
| 8,800,589 | B2 | 8/2014 | Minami et al. |
| 8,851,105 | B2 | 10/2014 | Kashima et al. |
| 8,910,656 | B2 | 12/2014 | Yasuda |
| 9,027,585 | B2 | 5/2015 | Smirnov |
| 9,081,388 | B2 | 7/2015 | Tanaka et al. |
| 9,188,989 | B1 | 11/2015 | Mudd et al. |
| 9,207,139 | B2 | 12/2015 | Jones et al. |
| 9,223,318 | B2 | 12/2015 | Takeuchi et al. |
| 9,690,301 | B2 * | 6/2017 | Mudd ................ G05D 7/0635 |
| 2001/0013363 | A1 | 8/2001 | Kitayama et al. |
| 2002/0002996 | A1 | 1/2002 | Mudd |
| 2002/0014206 | A1 | 2/2002 | Mudd |
| 2002/0046612 | A1 | 4/2002 | Mudd |
| 2002/0095225 | A1 | 7/2002 | Huang et al. |
| 2004/0007180 | A1 | 1/2004 | Yamasaki et al. |
| 2004/0083807 | A1 | 5/2004 | Mudd et al. |
| 2005/0056211 | A1 | 3/2005 | Lindfors et al. |
| 2005/0087299 | A1 | 4/2005 | Okabe et al. |
| 2005/0098906 | A1 | 5/2005 | Satoh et al. |
| 2006/0005883 | A1 | 1/2006 | Mudd et al. |
| 2006/0037644 | A1 | 2/2006 | Nishikawa et al. |
| 2006/0060139 | A1 | 3/2006 | Meneghini et al. |
| 2006/0124173 | A1 | 6/2006 | An |
| 2006/0130755 | A1 | 6/2006 | Clark |
| 2006/0185746 | A1 * | 8/2006 | Doyle ................ F15B 13/0817 137/884 |
| 2007/0089789 | A1 | 4/2007 | Mudd et al. |
| 2007/0110636 | A1 | 5/2007 | Lee et al. |
| 2007/0227659 | A1 | 10/2007 | Iizuka |
| 2008/0041481 | A1 | 2/2008 | Mudd et al. |
| 2008/0305014 | A1 | 12/2008 | Honda |
| 2009/0101217 | A1 * | 4/2009 | Ushigusa ............... G01F 1/36 137/511 |
| 2010/0110399 | A1 | 5/2010 | Lyons |
| 2010/0138051 | A1 | 6/2010 | Glime |
| 2010/0224264 | A1 | 9/2010 | Homan et al. |
| 2010/0269924 | A1 | 10/2010 | Yasuda |
| 2011/0108126 | A1 | 5/2011 | Monkowski et al. |
| 2012/0116596 | A1 | 5/2012 | Yoneda et al. |
| 2012/0132291 | A1 | 5/2012 | Monkowski et al. |
| 2012/0180876 | A1 | 7/2012 | Hayashi et al. |
| 2012/0318383 | A1 * | 12/2012 | Yasuda ................ G05D 7/0635 137/455 |
| 2013/0092256 | A1 | 4/2013 | Yasuda et al. |
| 2013/0092258 | A1 | 4/2013 | Yasuda et al. |
| 2013/0118596 | A1 * | 5/2013 | Horsky ................ F16K 17/00 137/12 |
| 2013/0186499 | A1 | 7/2013 | Yada et al. |
| 2014/0034164 | A1 | 2/2014 | Yasuda |
| 2014/0069527 | A1 | 3/2014 | Mudd et al. |
| 2014/0083514 | A1 | 3/2014 | Ding |
| 2014/0158211 | A1 | 6/2014 | Ding et al. |
| 2014/0190578 | A1 | 7/2014 | Hayashi |
| 2014/0230915 | A1 | 8/2014 | Mudd et al. |
| 2014/0260963 | A1 | 9/2014 | Wang |
| 2015/0007897 | A1 | 1/2015 | Valentine et al. |
| 2015/0027558 | A1 | 1/2015 | Kehoe et al. |
| 2015/0121988 | A1 | 5/2015 | Banares et al. |
| 2015/0212524 | A1 | 7/2015 | Kehoe et al. |
| 2015/0362391 | A1 | 12/2015 | Suzuki et al. |
| 2016/0011604 | A1 | 1/2016 | Mudd et al. |
| 2016/0018828 | A1 | 1/2016 | Mudd et al. |
| 2016/0041564 | A1 | 2/2016 | Mudd et al. |
| 2016/0124439 | A1 | 5/2016 | Yasuda et al. |

FOREIGN PATENT DOCUMENTS

| | | |
|---|---|---|
| CN | 103838261 | 6/2014 |
| DE | 69535683 | 1/2009 |
| EP | 0468793 | 1/1992 |
| EP | 0671484 | 9/1995 |
| EP | 0689040 | 12/1995 |
| JP | 11119835 | 4/1999 |
| JP | 2000018407 | 1/2000 |
| JP | 2004157719 | 6/2004 |
| JP | 3557087 | 8/2004 |
| JP | 2004302914 | 10/2004 |
| JP | 2007041870 | 2/2007 |
| JP | 4137666 | 8/2008 |
| JP | 4146746 | 9/2008 |
| JP | 2009079667 | 4/2009 |
| JP | 4351495 | 10/2009 |
| JP | 2009300403 | 12/2009 |
| JP | 4572139 | 10/2010 |
| JP | 4589846 | 12/2010 |
| JP | 4705140 | 6/2011 |
| JP | 2011171337 | 9/2011 |
| JP | 4974000 | 7/2012 |
| JP | 5090559 | 12/2012 |
| JP | 5091821 | 12/2012 |
| TW | 201414990 | 4/2014 |
| WO | WO8700267 | 1/1987 |
| WO | WO03081361 | 10/2003 |
| WO | WO200401516 | 12/2003 |
| WO | WO2011040409 | 4/2011 |

* cited by examiner

CONTROLLED DELIVERY OF PROCESS GAS USING A REMOTE PRESSURE MEASUREMENT DEVICE

CROSS-REFERENCE TO RELATED APPLICATIONS

This application claims the benefit of priority under 35 U.S.C. 120 as a continuation to U.S. application Ser. No. 13/590,253, filed on Aug. 20, 2012, entitled FLOW NODE TO DELIVER PROGESS GAS USING A REMOTE PRESSURE MEASUREMENT DEVICE, by Daniel T. Mudd et al., which in turn claims the benefit of priority under 35 U.S.C. 119(e) to U.S. Application No. 61/575,359, filed Aug. 20, 2011, entitled NEXT GENERATION GAS PANEL, FLOW NODES AND SELF RELIEVING REGULATOR, by Daniel T. Mudd et al., the contents of both being hereby incorporated by reference in their entirety.

FIELD OF THE INVENTION

The invention relates generally to gas delivery systems, and more specifically, to delivering a process gas using a remote pressure transducer.

BACKGROUND

Applications such as semiconductor fabrication processing increasingly require more accurate measurements, lower equipment costs, and quicker and more consistency in timing in the delivery of gases from components such as a mass flow controller (MFC).

An MFC is a device used to measure and control the flow of fluids and gasses. Conventionally, in pressure based MFC, a pressure transducer is needed within an MFC to measure the process gas pressure in a known volume and temperature.

FIG. 1A is a schematic diagram illustrating a prior art pressure based MFC 100 with a volume(V1) in conduit 198A that is used to measure pressure, according to a prior art embodiment. MFC 100 has an inlet port 101A, an outlet port 102A, a proportional inlet valve 103A, a first pressure transducer 104A, a restrictor 105A, a second pressure transducer 106A and a temperature sensor 107A. The first pressure transducer 104A measures pressure over V1 as an input for pressure regulation and is operates so that pressure at the first pressure transducer 104A closely matches the pressure at an inlet of the restrictor 105A. The second pressure transducer 106A is located downstream and a temperature sensor 107A is used to increase accuracy.

FIG. 1B is a block diagram of FIG. 1A illustrating a flow order for a process gas through the prior art pressure based MFC 100B, according to an embodiment of prior art. As shown, a process gas moves through a proportional valve 103B to a conduit containing V1 198B where the process gas is measured by a first pressure transducer 104B. Next the gas passes through restrictor 105B into a conduit with volume V2, 199B, where the pressure representative of the pressure at the outlet of the restrictor is measured. Finally, the process gas often exhausts from the MFC 100B to a process through an isolation valve actuator and seat 110.

Problematically, the space consumed by V1 hinders further efficiencies in accuracy, bleed down performance, space consumption and costs of gas delivery systems used for processing. Furthermore, when an external control directs the MFC to stop or reduce the magnitude of the gas flow to a lower rate of flow, V1 produces undesirable slow bleed down times to the new flow value.

What is needed is a flow node to provide an accurate delivery of process gas without the inefficiencies of a conventional MFC having an local pressure measurement directly on V1, by utilizing a remote pressure measurement of V1 pressure to reduce the bleed down volume while still providing pressure measurements that represent the pressure of the gas inlet to the restrictor with sufficient accuracy to maintain the specified accuracy of the flow device.

SUMMARY

The present invention addresses these shortcomings by providing a device, a method to deliver process gas using a remote pressure measurement device.

In one embodiment, an apparatus (e.g., a flow node) operates in conjunction with an upstream, remotely-located pressure regulation for controlled delivery of process gas. The apparatus includes a valve controlled by an actuator to receive a process gas into a conduit. A characterized restrictor is placed in series and adjacent with the valve seat to provide a primary flow restriction while having a minimized volume between the valve seat and the characterized restrictor.

In one embodiment, a conductance of the characterized restrictor is low enough relative to a conductance of the valve seat that the valve seat creates a negligible pressure drop compared to the pressure drop created by the characterized restrictor. Once the process gas has passed through the characterized restrictor, an outlet exhausts the process gas from the conduit. By knowing the characterization of the restrictor, and accordingly controlling a pressure of the process gas, the desired mass flow is delivered.

In one embodiment, a pressure measurement device, such as a pressure transducer, is located within an upstream pressure regulator such as an electronic regulator. In another embodiment, a vent is provided to bleed down the process gas. As a result of venting, the process gas pressure can be quickly reduced.

In some embodiments, a plurality of parallel flow nodes provides a wider dynamic range of flow rates in less space than a standard mass flow controller (MFC) and with less cost than providing multiple MFC to cover an equivalent operating range. For example, one flow node can be activated for low flow rates, while another flow node can be activated for higher flow rates. Further, the flow nodes can share an upstream pressure measurement and control device and an outlet. Numerous other embodiments are possible, as described in more detail below.

Advantageously, space and cost are reduced, while improving a dynamic range relative to a conventional MFC device.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

A device and method for a flow node to control gas flow utilizing a remote pressure measurement device are disclosed. In general, the flow node disclosed herein eliminates the local pressure measurement directly on V1 needed by MFCs (mass flow controllers) because a resulting pressure drop across conduits and poppet and valve seat of the flow node is designed to be insignificant relative to the remote measurement. The disclosed techniques can be implemented in a semiconductor fabrication process, or any other environment requiring flow rates of gas or fluid (e.g., low flow, high flow, 0.1 sccm, or 30,000 sccm) within tight tolerance limits or where reduced equipment cost is desired.

Figure 2A:
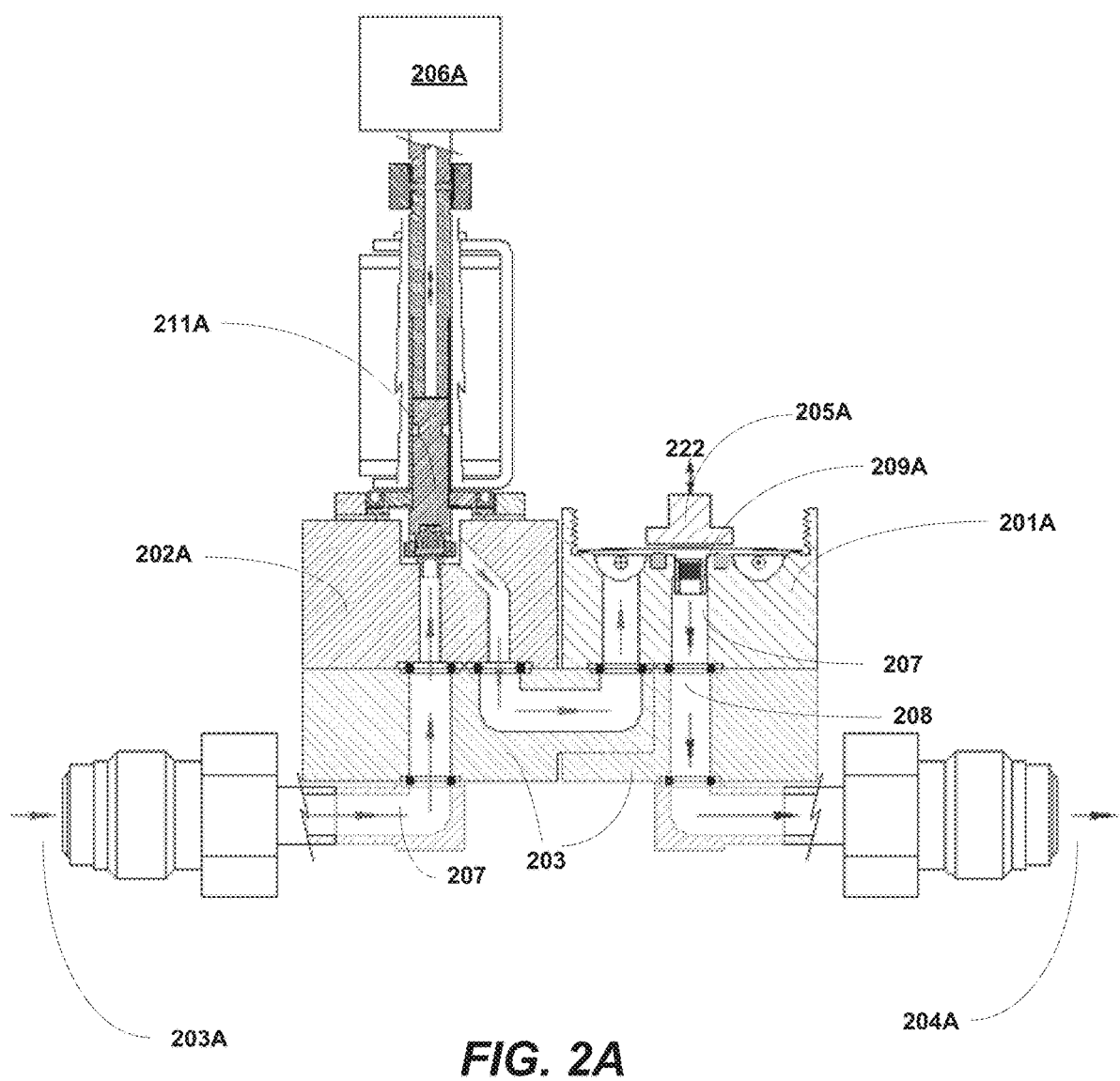
FIG. 2A is a schematic diagram illustrating a gas stick including a flow node with a remote pressure measurement, according to an embodiment.

FIG. 2A is a block diagram illustrating a gas stick 200A that includes a flow node 201A making use of a remote pressure measurement, according to an embodiment. The gas stick 200A also includes an electronic regulator 202A and an inlet 203A and outlet 204A to a conduit.

The inlet 203A of a VCR fitting (e.g., as produced by Parker Corporation) receives a process gas into a conduit. Nitrogen is an exemplary process gas, but any suitable gas or fluid could be substituted. The conduit(s) can be any suitable tubing or plumbing, either rigid or flexible, to move the process gas through and to the electronic regulator 202A and the flow node 201A. The conduit can have an outside diameter of, for example, ¼ inch and inside diameter of 3/16 inch. K1S substrate blocks 203, as manufactured by Hytron Corporation, serve as an interconnecting platform for the electronic regulator 202A, the flow node 201A and the inlet conduit 203A and outlet 204A conduit.

The outlet 204A of a VCR fitting delivers the process gas to a next conduit for eventual use by the process. In some embodiments, additional processing is performed on the process gas, such as mixing with other gases, or the like.

The flow node 201A includes a valve seat and poppet assembly 205A, an actuator 222 (represented by the arrow up/down arrow), internal conduits 207 (can represent one or more portions of conduit), interface sealing surfaces 208 and a characterized restrictor 209A. The flow node 201A is connected in series with an upstream electronic regulator 202A having a pressure transducer 206A. Generally, the flow node 201A limits a mass flow of gas or liquids in known manner that is in accordance with a pressure of a gas or liquids as measured upstream. Optionally a pressure measurement and/or temperature assumed, measured or communicated by other instrumentation elsewhere in the system can be used to improve the accuracy of the flow if available.

The valve seat and poppet assembly 205A includes an opening for gas flow and a movable poppet to preclude gas flow. In operation, the poppet moves between on and off by opening to allow process gas to flow into the conduit and closing to stop the process gas. In one embodiment, the valve seat has a high conductance relative to the characterized restrictor 209A (or alternatively, has low impedance relative to the characterized restrictor), for example, a ratio of 10:1, 200:1 (preferred) or higher. The conductance of an on/off valve such as used in the flow node, can be the maximum practical amount for a design envelope. With the conventional MFC using a proportional valve as opposed to an on/off isolation valve, conductance has to be balanced with (and thus, is limited by) flow resolution needs.

The characterized restrictor 209A is located, in one embodiment, directly adjacent to and in series with the valve seat and poppet assembly 205A. The characterized flow restrictor 209A can be a laminar flow element (compressible or in-compressible flow), an orifice (sonic, sub sonic or molecular), a venturi nozzle (sonic, sub sonic or molecular), or the like. As discussed, the characterized restrictor 209A is selected to provide the desired full-scale flow at or slightly below the target full scale pressure to be delivered to the flow node 201A and still have a low conductance relative to a conductance of the valve seat. A resulting pressure drop from the pressure regulator output, through the conduits to the flow node 201A and across the valve seat of the flow node 201A is small enough to be ignored so that a pressure measurement within the flow node 201A is not required to achieve a desired accuracy.

For example, a characterized restrictor designed to flow 5,000 sccm at P1=2000 Torr is placed in the throat of an air valve with a flow impedance and associated plumbing that generates, for instance, a 0.15 Torr pressure drop when delivering the 5000 sccm flow through the restrictor at 2000 Torr. The induced flow error would be roughly 0.15% of reading if the characterized restrictor is a compressible laminar flow element. The 0.15% is well within the 1% reading of the device and is acceptable allowing the device to maintain it specified accuracy.

An electronic regulator 202A with the pressure 206A transducer and a proportional valve 211A measures and correspondingly controls a pressure of the process gas within the conduit. A proportional valve 211A of the electronic regulator 202A modulates to control a pressure of the process gas inlet in accordance with pressure set points. The pressure set points can be received automatically from a controller or manually input. In some embodiments, the pressure set points are externally calculated to cause a desired mass flow rate. In some embodiments, the electronic regulator can maintain accuracy from an upstream location for flows up to 8 SLM (standard liter per minute) on N2 (nitrogen) or 4 SLM on SF6 (sulfur hexafluoride) for flow nodes using a ¼" air valve commonly used in the industry. In other embodiments, flow rates can be higher if larger standard components or non-standard modified components are used. At a certain point as flow rate gets larger, parasitic losses of pressure across the valve seat make the overall pressure drop larger, relative to the pressure delivered to the restrictor 209A, than manageable to maintain flow measurement accuracy.

Figure 2B:
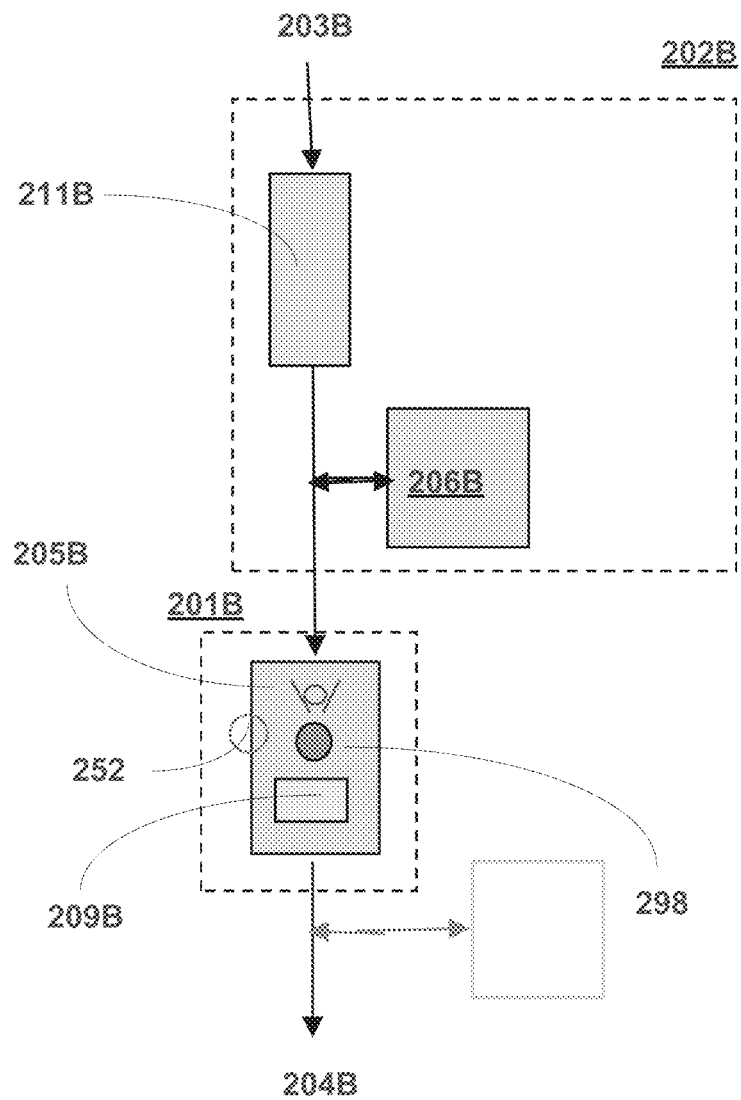
FIG. 2B is a block diagram of FIG. 2A illustrating a flow order for a process gas though a gas stick including a flow node making use of a remote pressure measurement, according to an embodiment.

FIG. 2B is a block diagram of FIG. 2A illustrating a flow order for a process gas though a gas stick 200B that includes a flow node 201B with a remote pressure measurement, according to an embodiment.

Figure 1A:
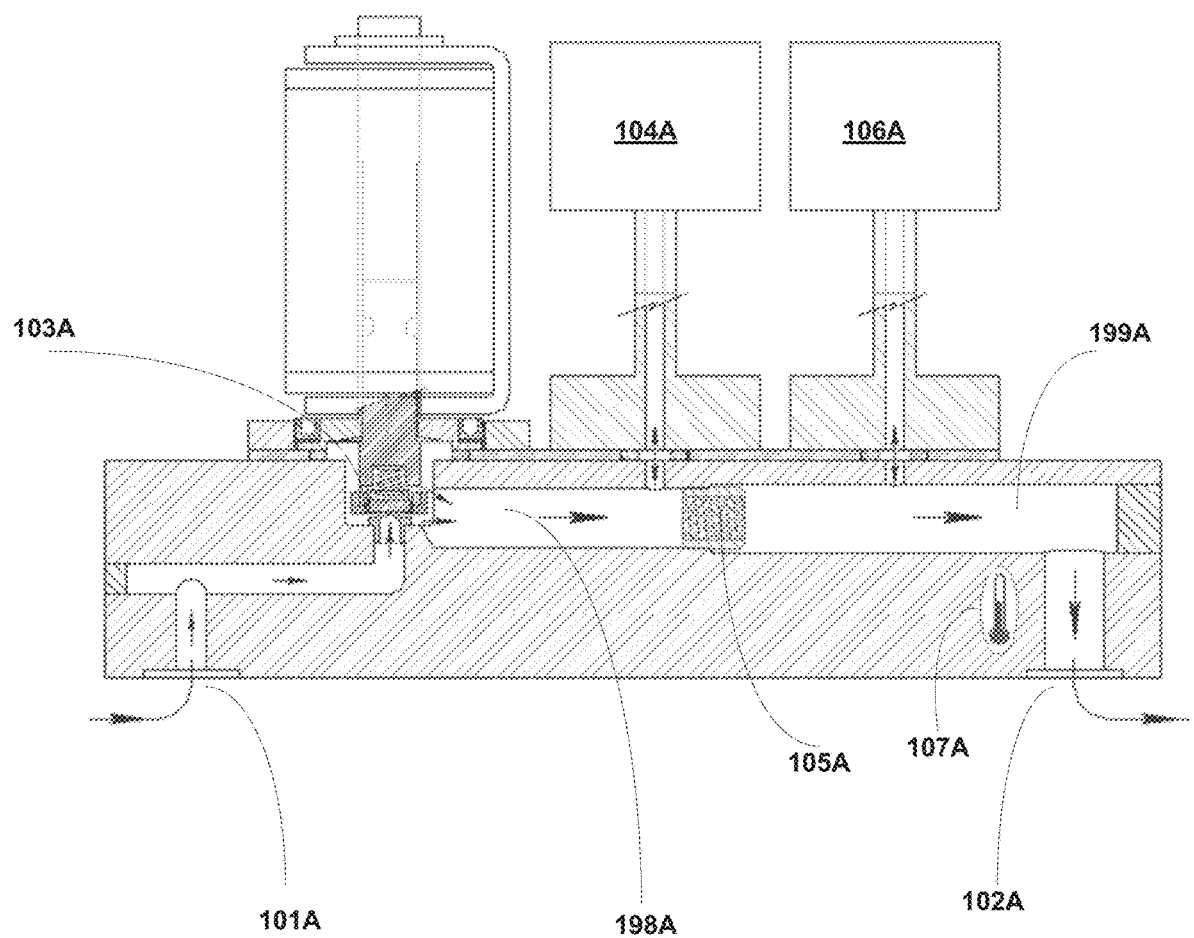
FIG. 1A is a schematic diagram illustrating a prior art pressure based mass flow controller (MFC) with a volume (V1) to measure pressure, according to a prior art embodiment.
Figure 1B:
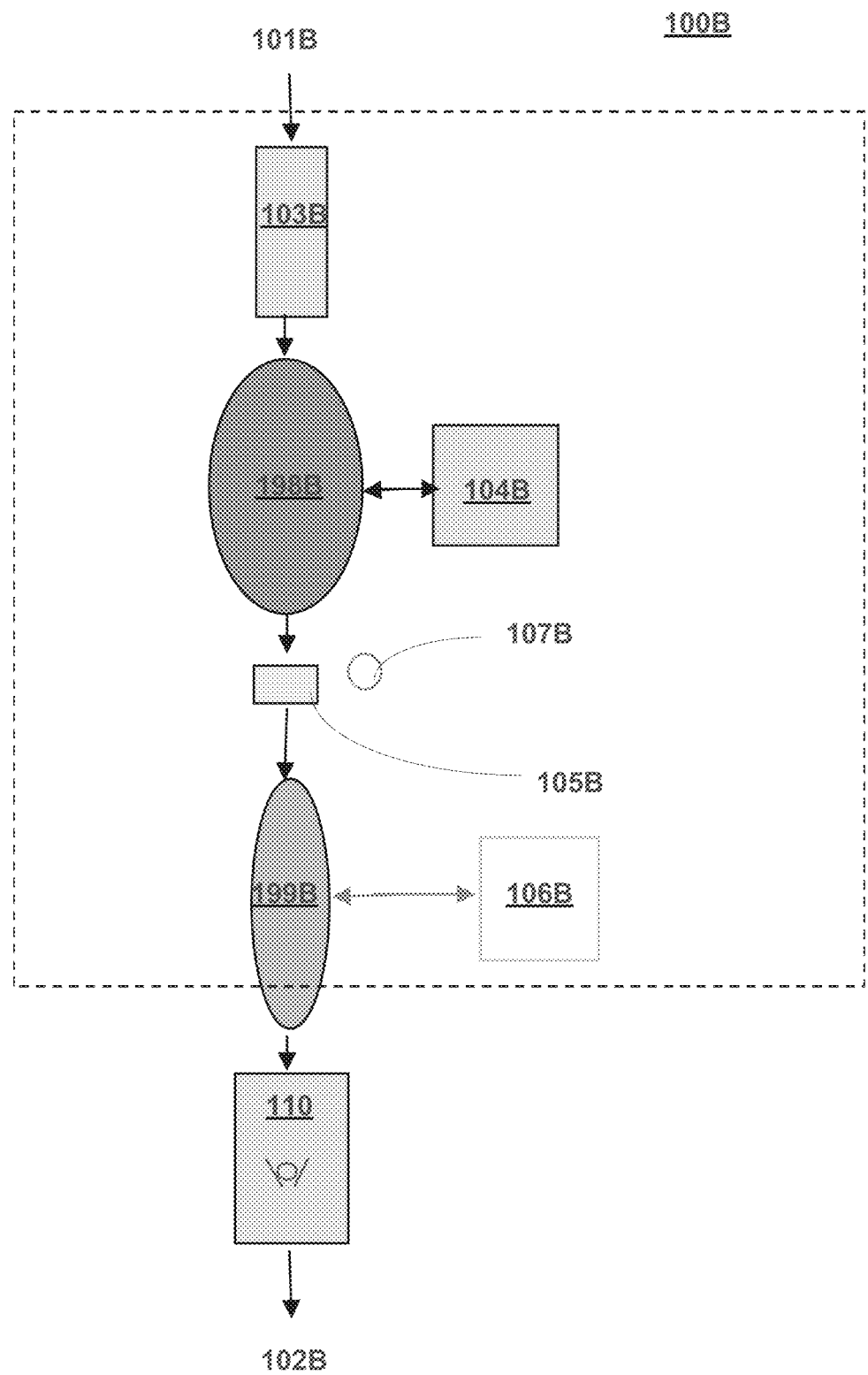
FIG. 1B is a block diagram of FIG. 1A illustrating a flow order for a process gas through a prior art pressure based MFC, according to an embodiment of prior art.

The gas is received through an inlet 203B to a proportional valve 211B that is modulated in coordination with a pressure transducer 206B to control pressure to the 201B flow node. A volume 298 for bleed down between the valve seat and poppet assembly 205B and the characterized restrictor 209B is minimized for faster bleed down (e.g., 50× faster). By minimizing the distance and geometry, the volume 298 of gas between the components is minimized relative to a conventional MFC. An exemplary volume of the resulting bleed off volume can be a negligible at 0.02 cc, 0.01 cc or less. As shown in FIG. 1B, an exemplary bleed off volume of an MFC can be 0.50 cc. Optionally, a temperature sensor 252 provides an internal temperature measurement, although temperature can also be received from external components such as a gas box temperature controller or sensor.

Additionally, the MFC has typical measurements of 1.1" (W)×4.1" (L)×5" (H), compared to a flow node constructed from an air valve having measurements of 1.1" (W)×1.1" (L)×4' (H) for similar operational parameters. Further, the pressure based MFC can cost $2,500, while an air valve can cost $90 in volume and a characterized restrictor to press in the air valve and make a flow node from the air valve, can cost an additional $20.

Figure 3A:
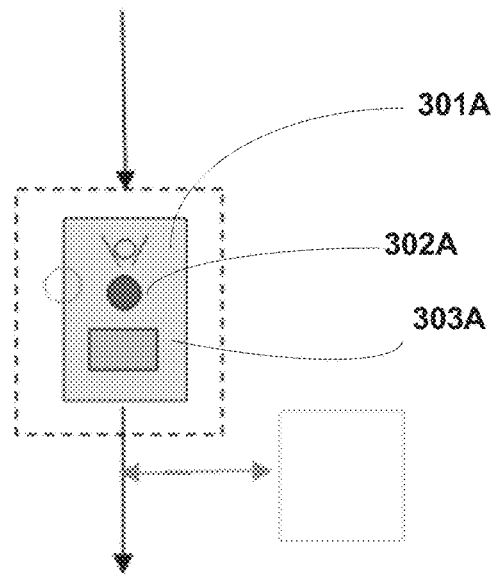
FIGS. 3A-3B are schematic diagrams illustrating alternative configurations of a valve relative to a characterized restrictor, according to some embodiments.
Figure 3B:
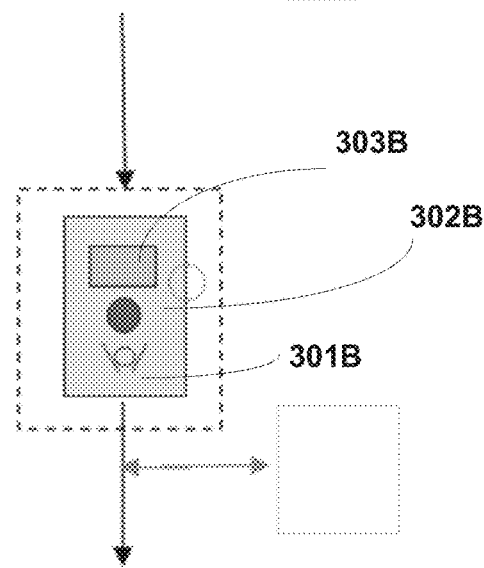

FIGS. 3A-3B are schematic diagrams illustrating alternative configurations of a valve relative to a characterized restrictor, according to some embodiments.

In more detail, the valve seat and poppet assembly 301A of a first configuration in FIG. 3A are located upstream of the characterized restrictor 303A. In some cases, the characterized restrictor 303A can be exposed to the multiple gases from other flow nodes and MFCs exhausting to a common conduit. In a no flow condition, the isolation on the flow node is closed, and small amounts of these other gases can backflow into the restrictor 303A which can lead to reliability issues such as corrosion or particle generation in the case where the gases are incompatible or in reacting families. In an alternative configuration of FIG. 3B, a characterized restrictor 303B is located upstream of a valve seat and poppet assembly 301B. By locating the valve seat and poppet assembly 301B downstream, the backflow is remediated. On the other hand, the buildup of gas pressure between the restrictor 303B and the downstream valve seat can cause a microburst which may be objectionable in some cases. So long as the ratio of conductance remains, the flow node operates within tolerable error limits.

Figure 4A:
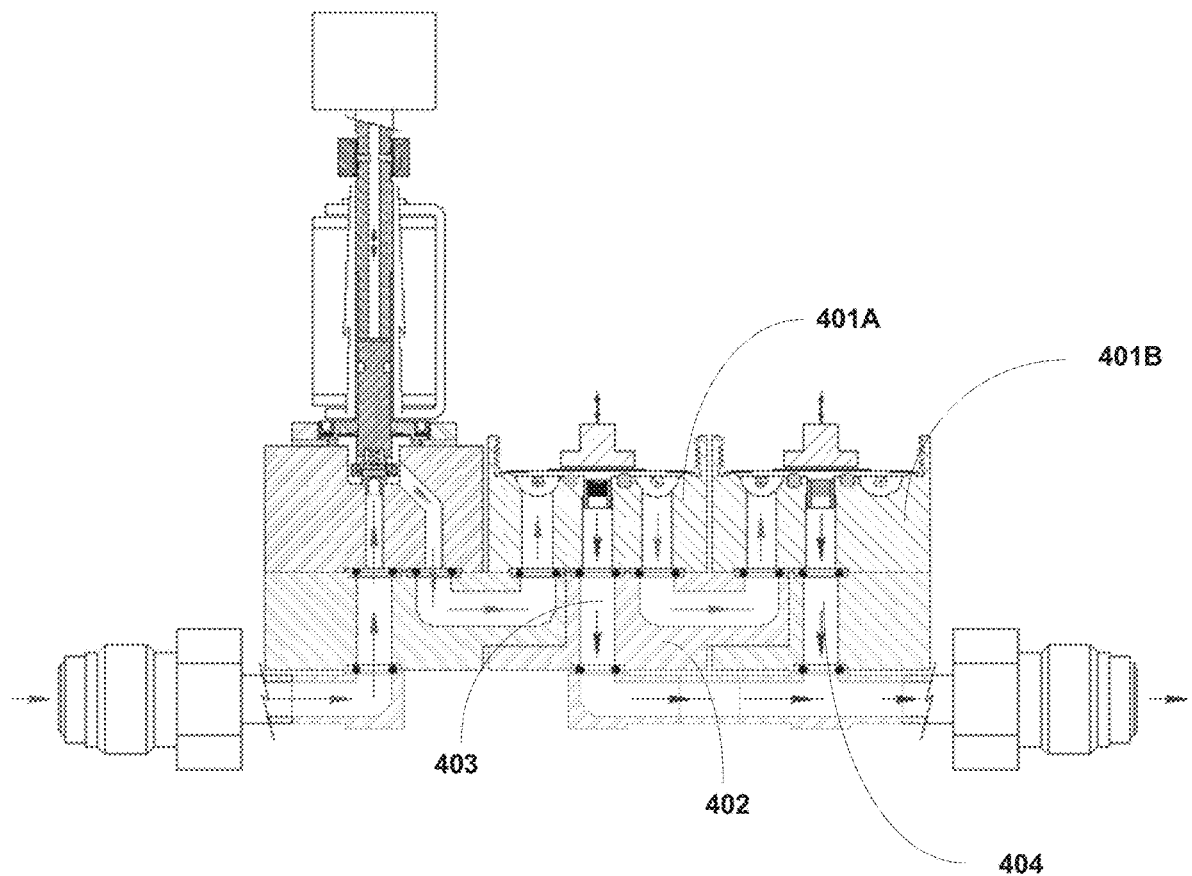
FIGS. 4A-4C are schematic diagrams illustrating alternative configurations of multiple flow nodes, according to some embodiments.
Figure 4B:
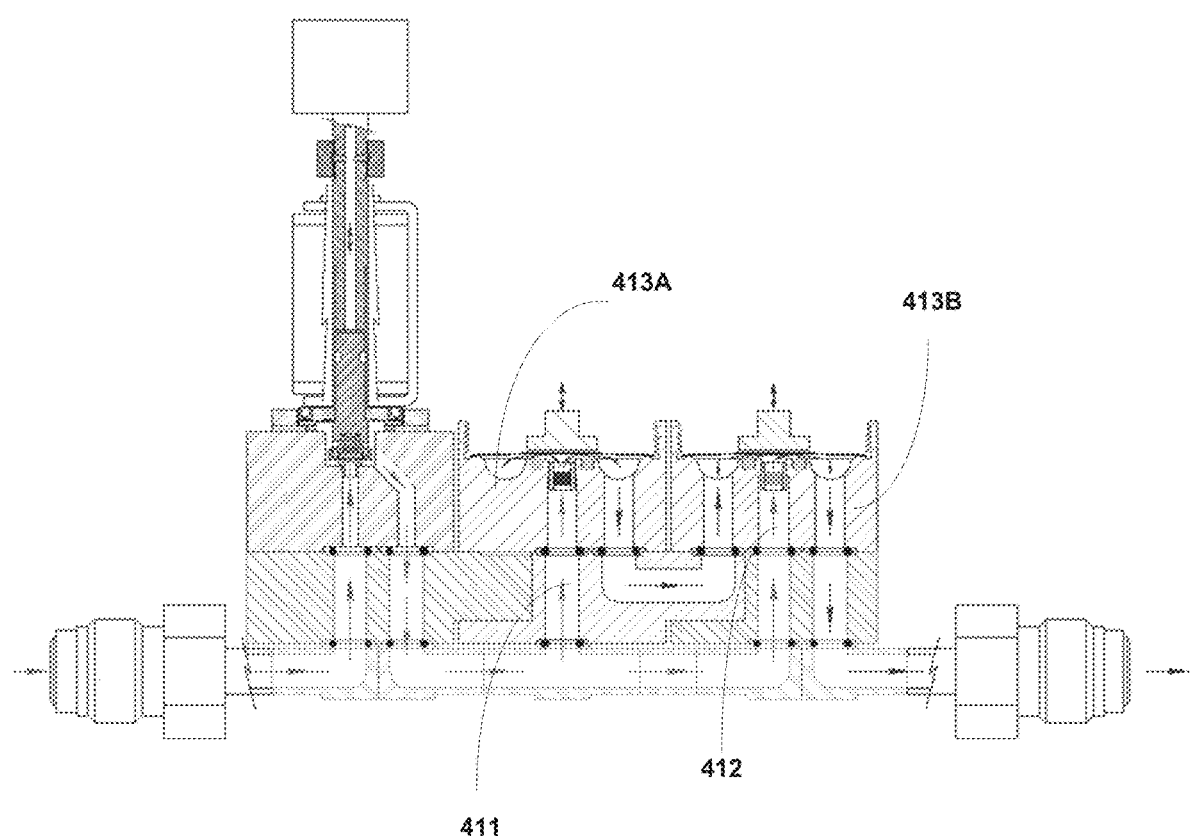
Figure 4C:
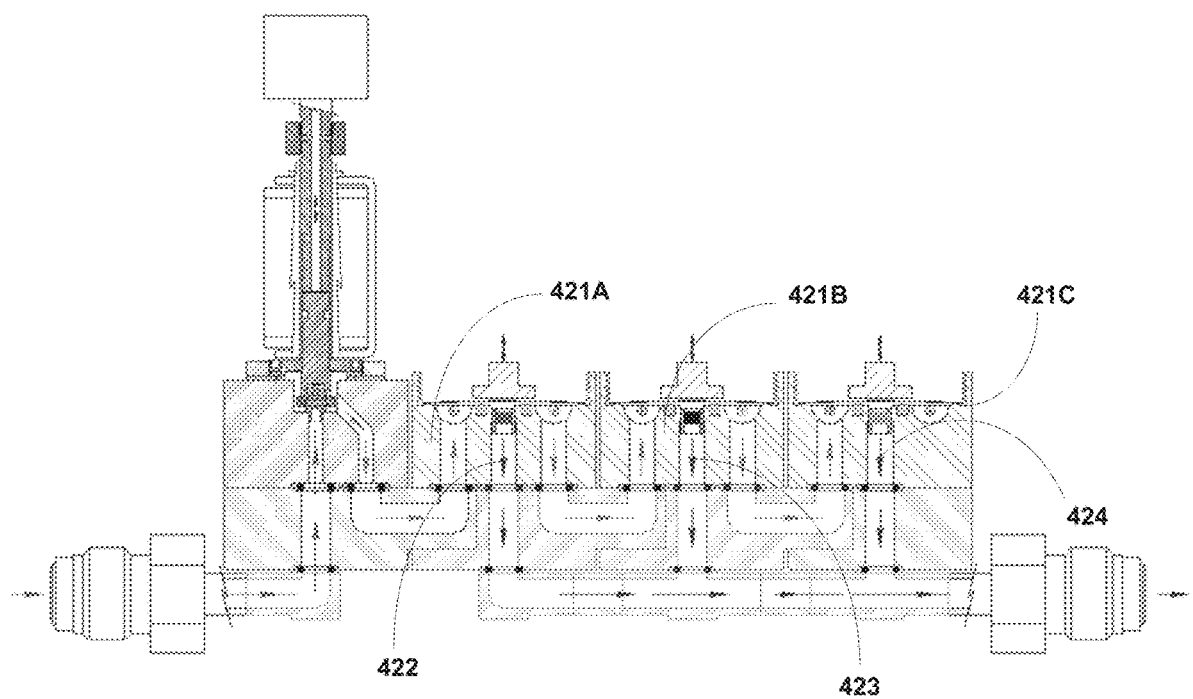

FIGS. 4A-4C are schematic diagrams illustrating alternative configurations of multiple flow nodes, according to some embodiments.

Specifically, FIG. 4A shows a gas stick 400A with two flow nodes 401A,B in parallel. An additional K1S substrate 402 is needed to support the additional flow nodes.

In operation, the process gas can flow through either flow node or both. When flow node 401A is open, the process gas flows to a conduit 403 and when flow node 401B is open, the process gas flows to a conduit 404. For example, one flow node can be configured to accurately handle low flows while the other flow node accurately handles all non-low flows. The dual flow node thus increases an overall dynamic range that is superior to an MFC. Further efficiency is achieved because a single pressure transducer is shared between the flow nodes.

While the characterized restrictors are located downstream of the valve seat in the FIG. 4A, FIG. 4B shows an example of characterized restrictors located upstream of the valve seat. When a flow node 413A is open, the process gas inlets through a conduit 411, and when a flow node 413B is open, the process gas inlets through a conduit 412.

A further example of FIG. 4C shows an embodiment of a gas stick 400C with three flow nodes 421A-C in a parallel configuration. This configuration provides the equivalent capability as three separate MFCs, but only occupies one third the space while providing a cost savings. The embodiment also shows characterized restrictor located downstream of the valve seat and poppet assemblies, although the opposite configuration is also possible. When the flow node 421A is open, the process gas flows through a conduit 422, when the flow node 421B is open, the process gas flows through a conduit 423, and when the flow node 421C is open, the process gas flows through a conduit 424.

Figure 5A:
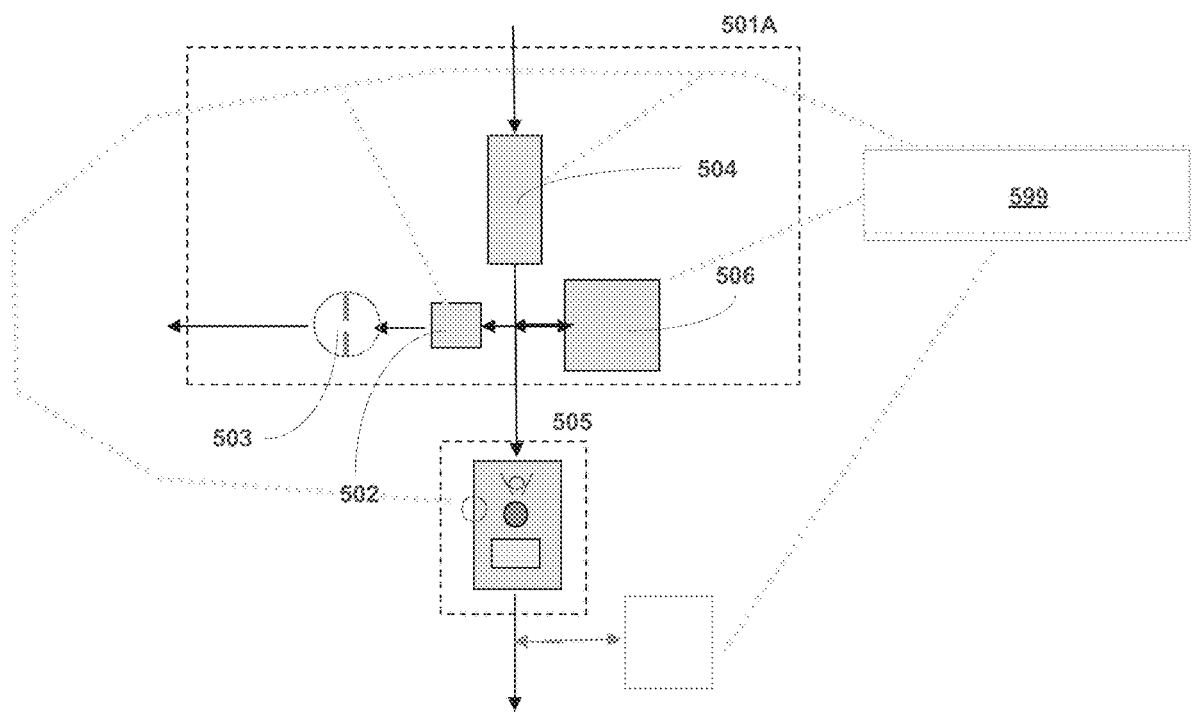
FIG. 5A is a block diagram illustrating a flow node supplied by a self-venting electronic regulator, according to some embodiments.
Figure 5B:
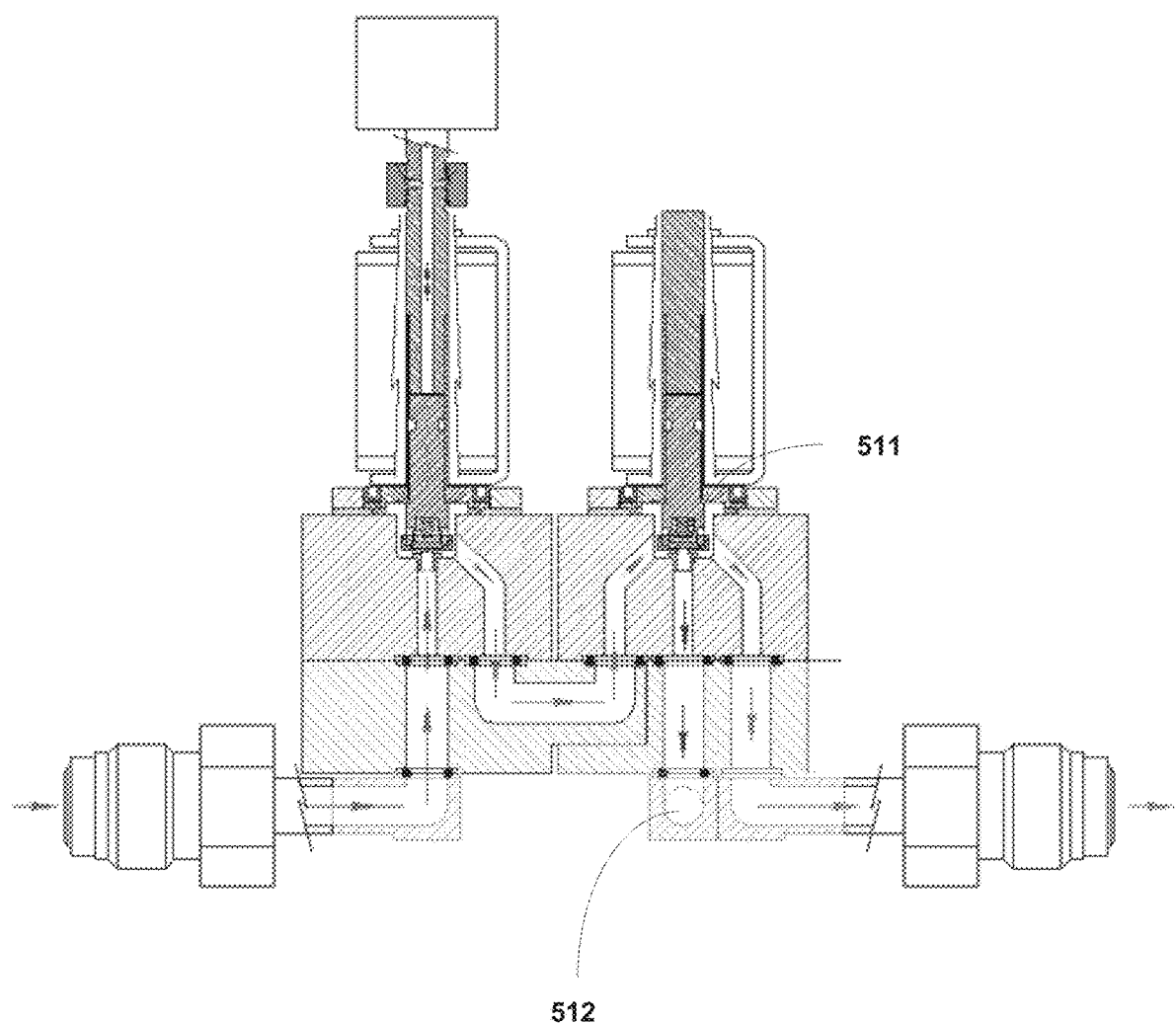
FIGS. 5B-5C are schematic diagrams illustrating an electronic regulator of FIG. 5A used in conjunction with self-venting mechanisms, according to some embodiments.
Figure 5C:
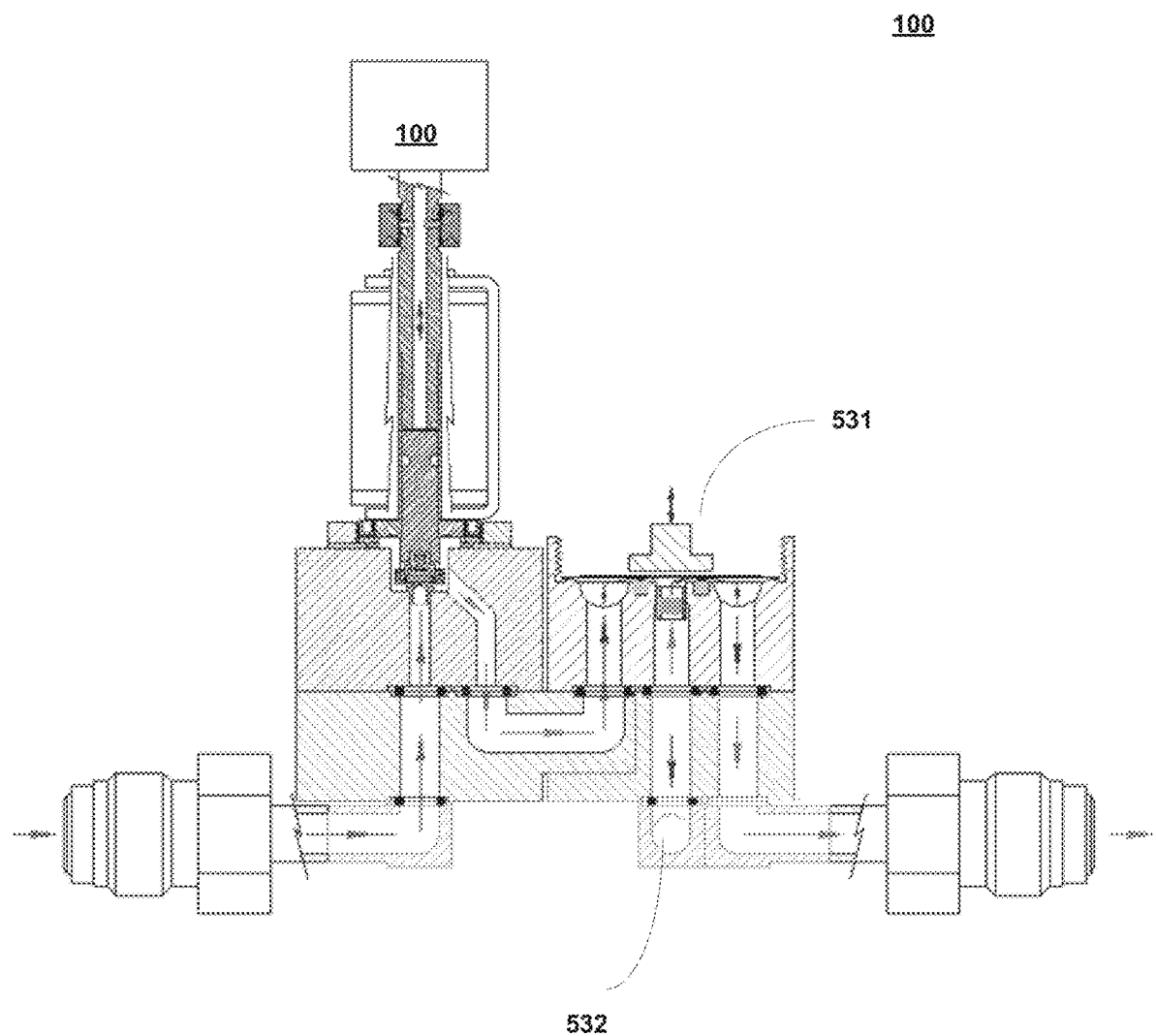

FIGS. 5A-5C are schematic diagrams illustrating a flow node supplied by a self-venting electronic regulator, according to some embodiments.

The proportional dump valve, or optional on/off valve with flow limiting restrictor in series, allows process gas to be vented from the additional conduit routed to a vent. By quickly depressurizing the conduit in a low flow scenario, changes in mass flow rate are realized with reduced bleed times.

As shown in FIG. 5A, an electronic regulator 501A includes a valve 502 and optional flow limiting restrictor 503 in series with a conduit to a vent. A feedback and control 599 can coordinate components. The configuration can relieve a volume of gas between a proportional valve 504 and a flow node 505 (and coupled to a pressure transducer 506) allowing it to transition more quickly from a higher pressure set point to a new lower pressure set point than could occur without the venting of gas, thus avoiding intolerable slow bleed down.

In an embodiment of FIG. 5B, a proportional valve 511 provides a controlled release of the process gas to a conduit 512 for venting. In an embodiment of FIG. 5C, an on/off valve 531 with a limiting flow restrictor is used release the process gas to a conduit 532 for venting. The on/off valve 531 and limiting flow restrictor are preferred in some cases due to lower cost and less complexity for control.

Figure 6:
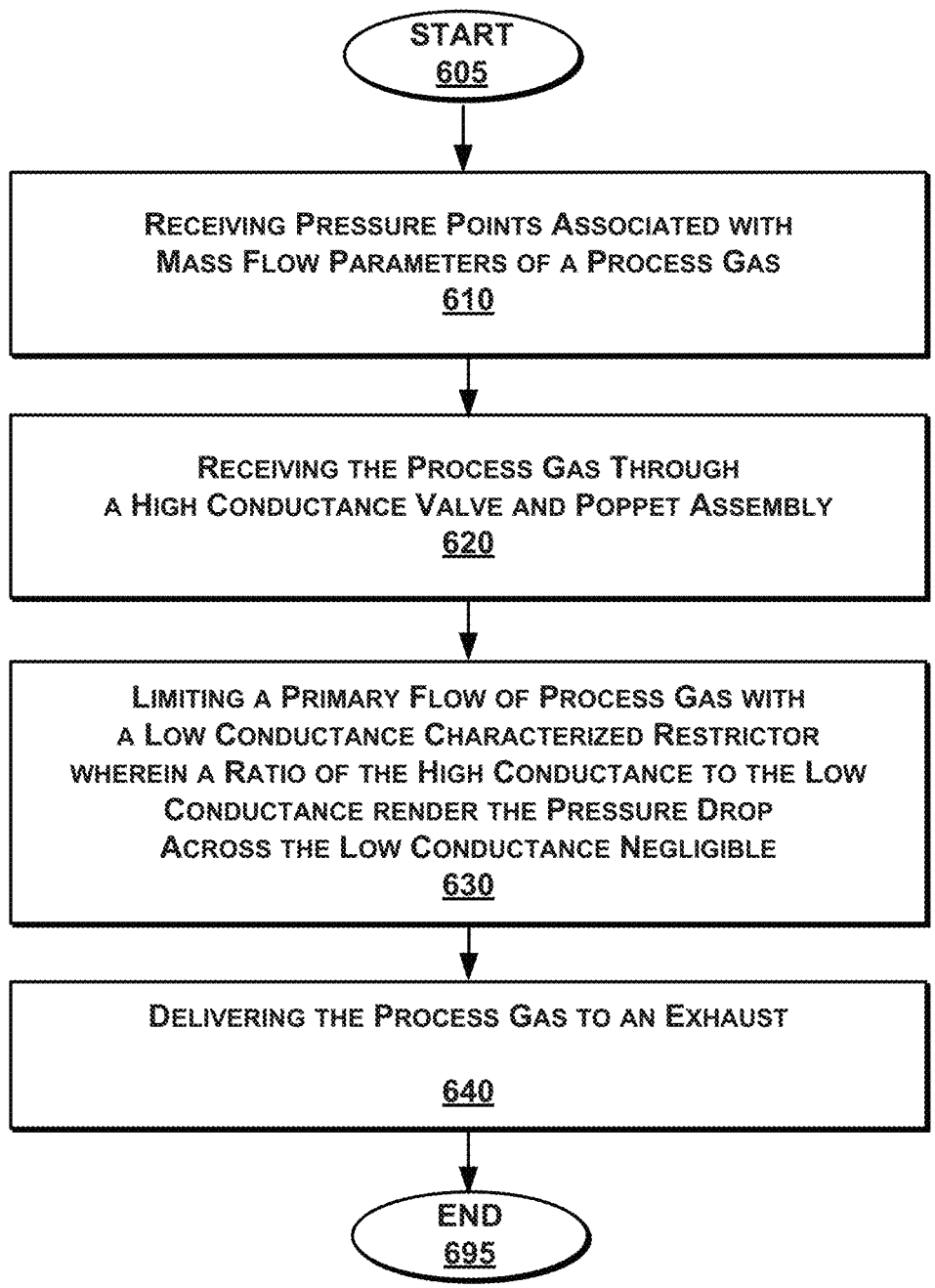
FIG. 6 is a flow chart illustrating a method for delivering a process gas making use of a remote pressure measurement device and flow node, according to an embodiment.

FIG. 6 is a flow chart illustrating a method for delivering a process gas with a remote pressure measurement, according to an embodiment. The method can be implemented by any of the flow nodes discussed above.

At step 610, pressure points associated with mass flow parameters of a process gas are received. For example, an electronic regulator can receive pressure set points from a controller that is aware of characteristics of the flow node and a temperature and pressure, P2 (assumed or measured).

At step 620, a process gas is received through a high conductance valve and poppet assembly. An actuator changes position to move the poppet, thereby allowing or preventing gas flow.

At step 630, a primary flow of the process gas is limited by the low conductance characterized restrictor. As the restrictor is characterized so that flow is known as a function of pressure to the restrictor, a mass flow through the restrictor is known if one knows the pressure delivered to the flow node. Correspondingly, one can change mass flow to a new desired value by changing the pressure delivered to the flow node. As discussed, a ratio of conductance between the valve seat and the characterized restrictor, along with a minimized volume between the two, produces a very low pressure drop allowing the remote pressure measurement to represent the pressure at the inlet of the restrictor with sufficient accuracy to allow sufficiently accurate flow measurement.

At step 640, the process gas is delivered to an exhaust. The process gas can move on to be mixed with other gases, heated, cooled, or the like.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A control apparatus for delivery of a process gas, comprising:
   an inlet conduit to receive the process gas;
   a valve fluidly coupled to the inlet conduit and alterable between an open condition and a closed condition, the valve having a first conductance and being downstream of the inlet conduit;
   a characterized restrictor inserted into an opening of the valve, said characterized restrictor being adjacent to and in series with the valve, the characterized restrictor having a second conductance; and
   an outlet conduit to exhaust a controlled flow of the process gas passing through the characterized restrictor;
   wherein a ratio of the first conductance to the second conductance is 10:1 or higher.

2. The control apparatus of claim 1, further comprising:
   a pressure measurement device coupled to measure a pressure of the process gas upstream of the characterized restrictor.

3. The control apparatus of claim 2, wherein the pressure measurement device outputs measurements to an electronic regulator coupled upstream of the characterized restrictor.

4. The control apparatus of claim 3, wherein the electronic regulator receives an adjusted set point at least partially based upon a measurement of a pressure downstream from the characterized restrictor and a temperature.

5. The control apparatus of claim 2, wherein the pressure measurement device is part of an electronic pressure regulator coupled upstream of the characterized restrictor.

6. The control apparatus of claim 5, wherein the electronic pressure regulator receives an adjusted set point at least partially based upon a measurement of a pressure downstream from the characterized restrictor and a temperature.

7. The control apparatus of claim 1, wherein the characterized restrictor comprises one of:
   a laminar flow element and a sonic nozzle.

8. The control apparatus of claim 1, wherein the valve is an air valve.

9. The control apparatus of claim 1, further comprising a substrate block, the valve operably coupled to the substrate block and comprising a valve body, a valve seat, and a closure member, the characterized restrictor located within the valve body.

10. The control apparatus of claim 9, wherein the inlet conduit and the outlet conduit are located within the substrate block.

11. The control apparatus of claim 1, wherein in the closed condition, a volume exists between the valve and the characterized restrictor, the volume being 0.5 cubic centimeters or less.

12. A control apparatus for delivery of a process gas, comprising:
   an inlet conduit to receive the process gas;
   an electronic pressure regulator coupled to the inlet conduit and an internal conduit, said electronic pressure regulator including a pressure measurement device coupled to said internal conduit;
   a substrate block;
   a valve fluidly coupled to said internal conduit and alterable between an open condition and a closed condition, the valve operably coupled to the substrate block, the valve further comprising a valve body, a valve seat, and a closure member, the valve being downstream of the inlet conduit;
   a characterized restrictor inserted into an opening of the valve body of the valve, said restrictor being adjacent to and in series with the valve; and
   an outlet conduit to exhaust a controlled flow of the process gas passing through the characterized restrictor;
   wherein in the closed condition, a volume exists between the valve and the characterized restrictor, the volume being 0.02 cubic centimeters or less.

13. The control apparatus of claim 12, wherein the characterized restrictor is downstream of the valve.

14. The control apparatus of claim 12, further comprising:
   a second characterized restrictor connecting said internal conduit to the outlet fluid conduit, to bypass the valve fluidly coupled to the internal conduit, for defeating the total shut off capability of the valve closed condition.

15. The control apparatus of claim 12, wherein the valve has a first conductance and the characterized restrictor has a second conductance, a ratio of the first conductance to the second conductance is 10:1 or higher.

16. A control apparatus for delivery of a process gas, comprising:
   an inlet conduit to receive the process gas;
   an electronic pressure regulator coupled to the inlet conduit and a first internal conduit, said regulator including a pressure measurement device coupled to the first internal conduit;
   a substrate block;
   a first valve fluidly coupled to the first internal conduit and alterable between an open condition and a closed condition, the first valve operably coupled to the substrate block, the first valve further comprising a first valve body, a first valve seat, and a first closure member, the first valve being downstream of the inlet conduit;
   a first characterized restrictor inserted into an opening of the first valve body of the first valve, said first restrictor being adjacent to and in series with the first valve;
   a second valve fluidly coupled to the first internal conduit for actuating into an open condition and a closed condition, the second valve being downstream of the inlet conduit;
   a second characterized restrictor inserted into an opening of the second valve, said second restrictor being adjacent to and in series with the second valve; and
   an outlet conduit to exhaust a controlled flow of the process gas flowing through the first characterized restrictor and the second characterized restrictor;

wherein in the closed condition, a first volume exists between the first characterized restrictor and the first valve, the first volume being 0.5 cubic centimeters or less, and in the closed condition, a second volume exists between the second characterized restrictor and the second valve, the second volume being 0.5 cubic centimeters or less.

17. The control apparatus of claim 16, wherein the first characterized restrictor is downstream of the first valve, and the second characterized restrictor is downstream of the second valve.

18. The control apparatus of claim 16, wherein the first and second characterized restrictor are arranged in parallel.

19. The control apparatus of claim 16, wherein the first and second valves are arranged in parallel.

* * * * *